(No Model.) 3 Sheets—Sheet 1.

J. GJERS.
APPARATUS FOR TREATING METAL INGOTS.

No. 320,779. Patented June 23, 1885.

Witnesses:
J. H. Blackwood.
R. G. Du Bois.

Inventor:
John Gjers
by W. H. Doolittle,
Attorney.

(No Model.) 3 Sheets—Sheet 3.
J. GJERS.
APPARATUS FOR TREATING METAL INGOTS.

No. 320,779. Patented June 23, 1885.

Witnesses:
J. H. Blackwood
R. G. DuBois

Inventor:
John Gjers
by W. H. Doolittle
Attorney

UNITED STATES PATENT OFFICE.

JOHN GJERS, OF MIDDLESBROUGH-ON-TEES, NORTH RIDING, COUNTY OF YORK, ENGLAND.

APPARATUS FOR TREATING METAL INGOTS.

SPECIFICATION forming part of Letters Patent No. 320,779, dated June 23, 1885.

Application filed April 7, 1884. (No model.) Patented in England March 5, 1884, No. 4,425; in France March 8, 1884, No. 160,507; in Belgium March 10, 1884, No. 64,448; in Luxemburg March 20, 1884, No. 371; in Austria October 24, 1884, No. 11,409, and in Sweden January 23, 1885.

*To all whom it may concern:*

Be it known that I, JOHN GJERS, a subject of the Queen of Great Britain and Ireland, residing at Middlesbrough-on-Tees, in the North Riding, of the county of York, Kingdom of Great Britain and Ireland, have invented certain new and useful Improvements in Means and Apparatus for Treating Steel Ingots Preparatory to Manufacturing them into finished or partially-finished Articles, of which the following is a specification.

In treating steel ingots in soaking-pits according to my Patent No. 283,735, dated August 21, 1883, I find that the success is complete whenever the works are laid out favorably or approximately favorably to the object in view; but there are works of old and defective construction, where the place of the casting of the ingots is situated at a great distance from the rolling-mill or hammers, and sometimes also aggravated by the use of very small ingots where a difficulty is found in retaining a sufficient margin of heat successfully to treat the ingots in the soaking-pits. This difficulty and loss of margin of heat is always felt principally in the extreme top of the ingot; hence by my proposed improvements I provide means whereby an ingot, which has from the above causes suffered too great a loss of heat in the extreme top, may, when necessary, have a small portion of heat added to its top part at the same time that it is as a whole subjected to the soaking process, as set forth in my before-mentioned specification—viz, by being placed in pits or cells built in a mass of brick-work or other heat-absorbing and sufficiently refractory material, which, acting as an absorber and accumulator of heat, receives and radiates heat back to the ingot, and which remains while at work at a temperature as high as is necessary for the rolling or hammering of the ingot.

Figure 1:
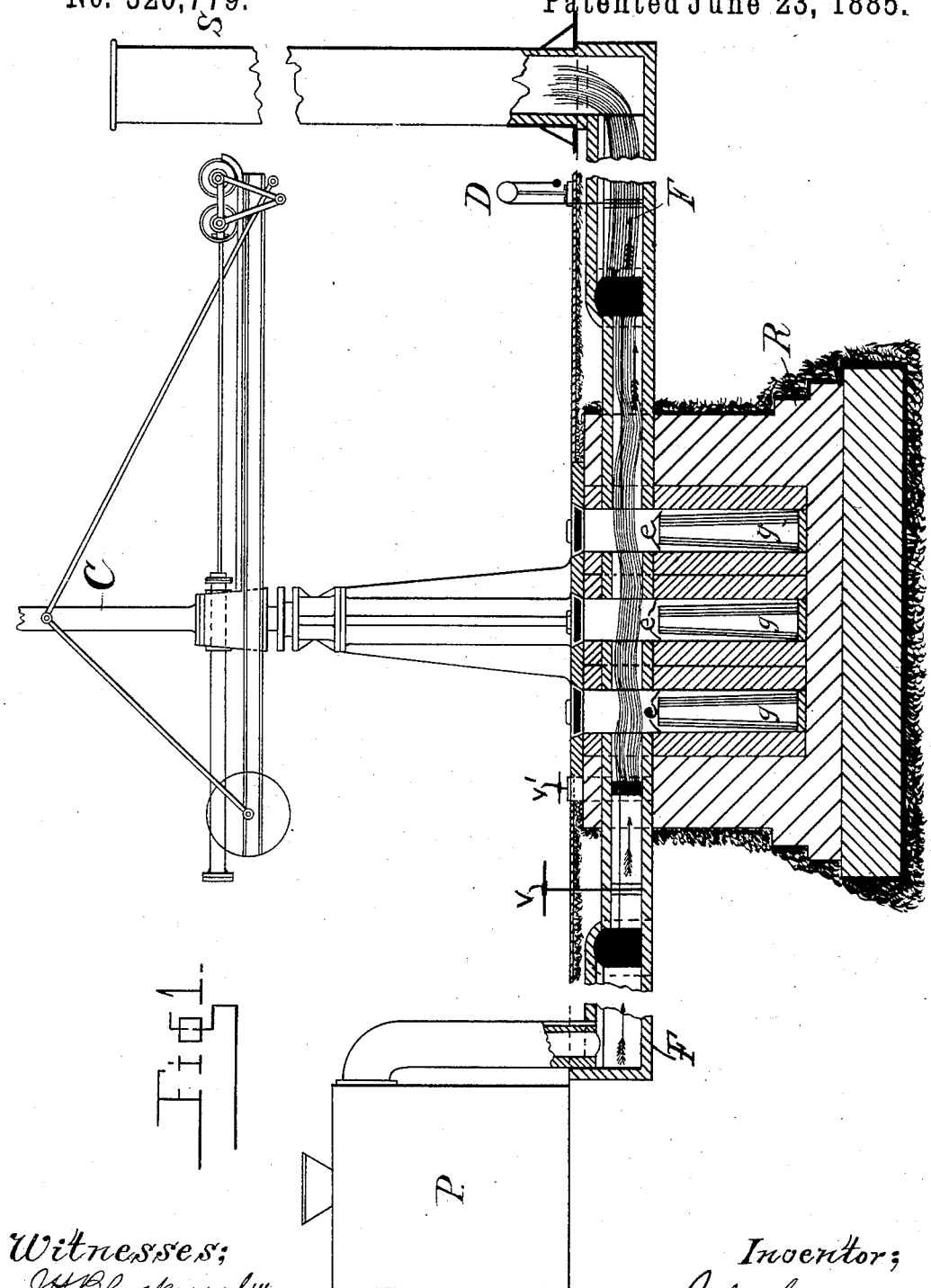
Figure 2:
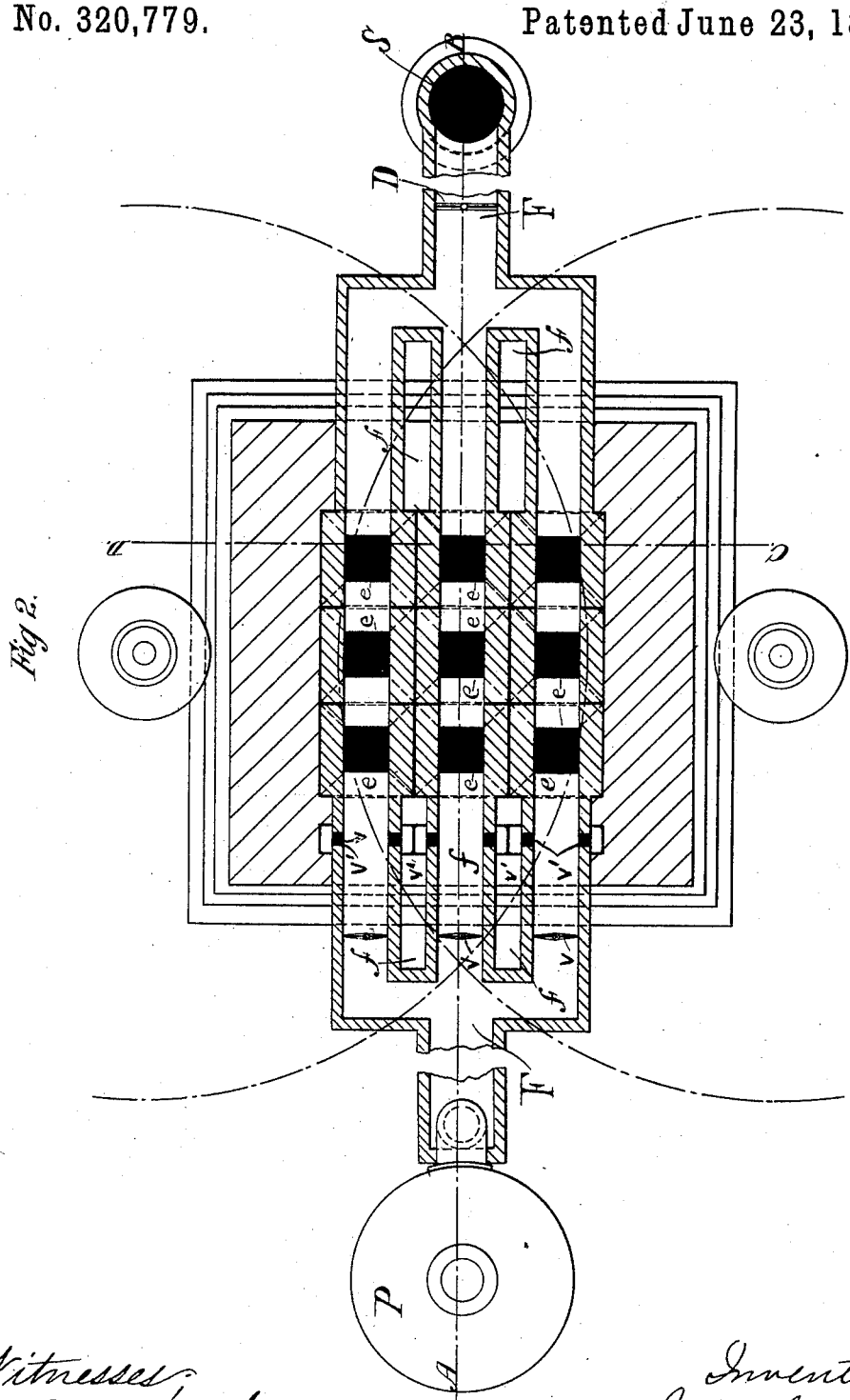
Figure 3:
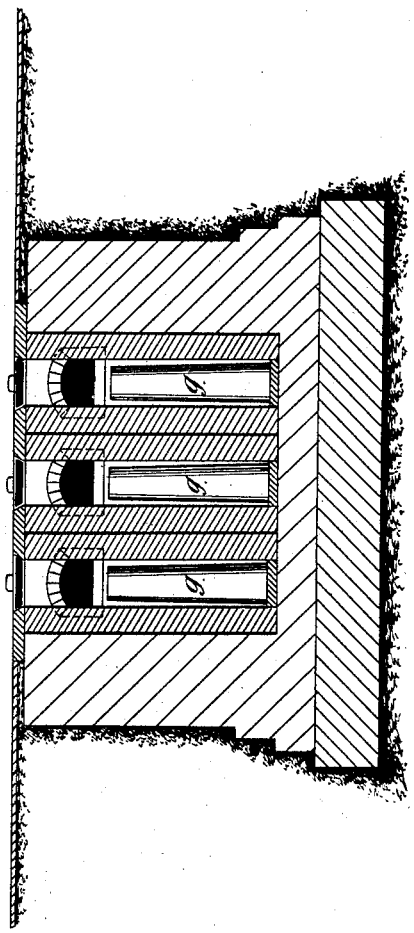

Referring to the drawings, where Figure 1 is an elevation and part vertical section of my improved apparatus, Fig. 2 a sectional plan of the same, and Fig. 3 a section through the line C D in Fig. 2, the section in Fig. 1 being taken through the line A B in Fig. 2, I have shown a set of nine soaking-pits, *e*, constructed in a mass of refractory material, R, similar to those described in my before-mentioned specification, except that they are so much deeper as to allow a gas-flue to pass from pit to pit somewhat above the top of the heated ingots, which are marked *g g g*, and are shown placed in the soaking-pits.

I show in Fig. 1 a crane, C, which is a well-known useful appliance for transferring the ingots, and I also show a gas-producer, P, (which may be situated at any convenient distance and be of any form,) and a main gas-flue, F, which branches into as many separate smaller flues, *f*, as there are rows of ingots. (In this case three.) Each has its separate shut-off valve *v* and inlet *v'* for air, where the gas is simply ignited and passes as flame over the top of the rows of ingots and out at the other end into a chimney, S, (which may be at any distance and have the draft regulated by a damper, D.) It will be seen, therefore, that I employ an ordinary soaking pit or pits, as described in my before-mentioned specification, with a comparatively small gas-flame passing over but not impinging upon the top of the ingots, which radiates a portion of heat to the top of the ingot, and also keeps the brick-work hot in the top part of the pit at a point where it is most likely to lose heat from being near to the floor-level. The gas is only kept burning when necessary—that is, when the ingot tops are deficient in heat; or it may be kept burning when there is any cessation of work, or when preparing the pits for work. The gas may also be kept burning when the lid is opened to put ingots in or take them out; or at such times the gas may be shut off from the particular row where the work is going on. It will be noticed that by preference I keep the top of the ingot slightly below the sheet of gas-flame, so that it may not directly impinge upon the ingot top and thereby cause oxidation.

I use the above means simply as an auxiliary to be employed in case of need, and not in any way interfering with the soaking process which is going on in the pit as usual. It should also be remarked that the same object can be obtained by a suitably-arranged fire-grate, burning coal instead of employing the gas-producer, as shown, and that it may also be wholly or partially above ground, as in my before-mentioned specification, but that I recommend the below-ground arrangement in practice.

The process herein disclosed is not herein claimed, but forms the subject of my pending application No. 166,013.

What I claim is—

The means or apparatus for supplying to steel ingots such additional heat as may be necessary while said ingots are undergoing a soaking process, consisting in the combination, with a suitable soaking pit or pits, of a gas-producer, gas flue or flues leading over the pits, gas and air valves, damper, and chimney, substantially as described.

JOHN GJERS.

Witnesses:
JAS. L. ADAMS,
  52 *Hartington Road, Middlesbrough.*
HENRY MACREUTH,
  31 *Waterloo Road, Middlesbrough.*